No. 737,378. Patented August 25, 1903.

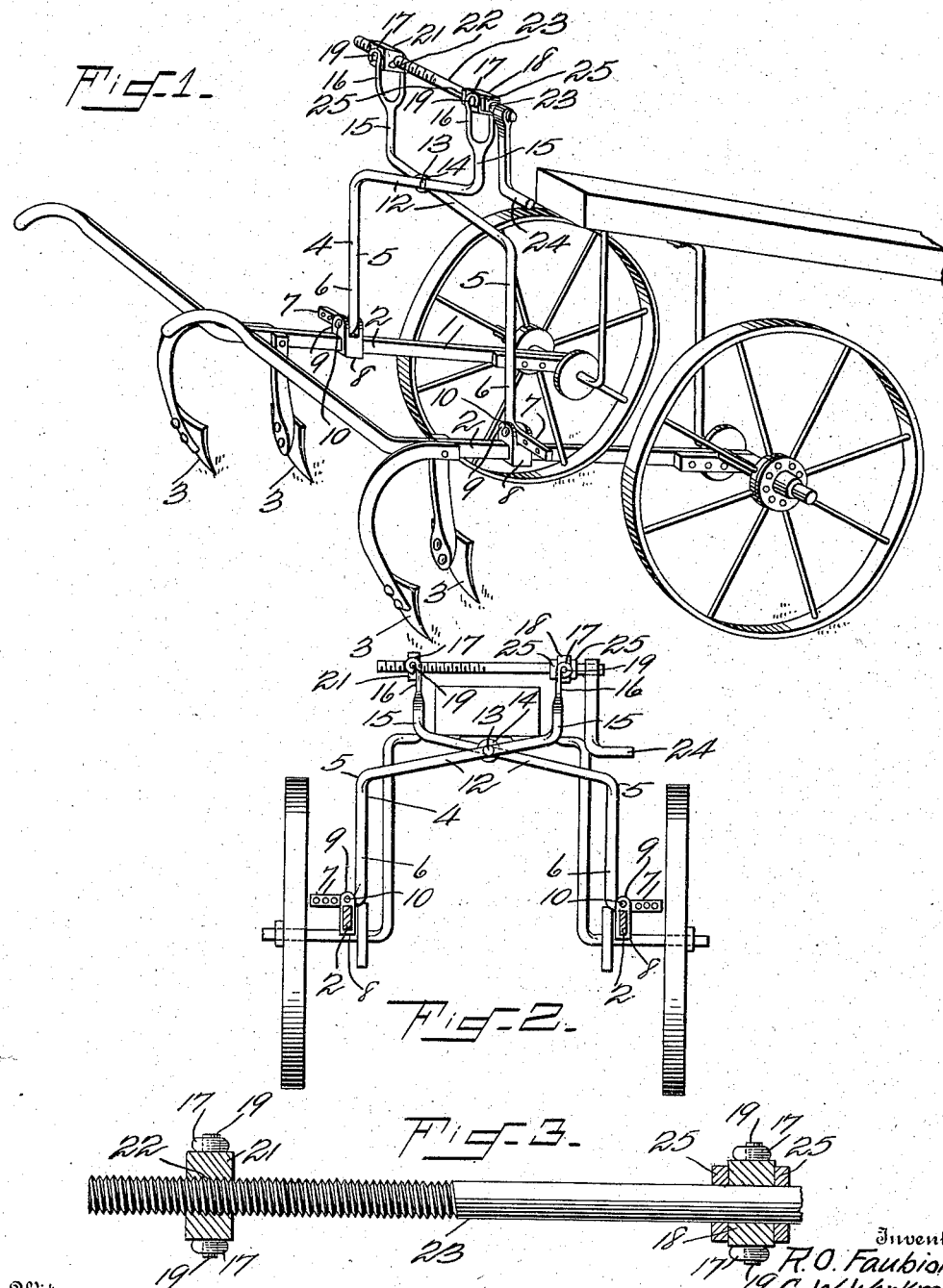

UNITED STATES PATENT OFFICE.

RUFUS O. FAUBION, CALVIN W. WORKMAN, AND CAVE G. WORKMAN, OF EVANT, TEXAS.

ATTACHMENT FOR CULTIVATORS.

SPECIFICATION forming part of Letters Patent No. 737,378, dated August 25, 1903.

Application filed February 2, 1903. Serial No. 141,519. (No model.)

*To all whom it may concern:*

Be it known that we, RUFUS O. FAUBION, CALVIN W. WORKMAN, and CAVE G. WORKMAN, citizens of the United States, residing at Evant, in the county of Coryell and State of Texas, have invented certain new and useful Improvements in Attachments for Cultivators; and we do declare the following to be a full, clear, and exact description of the invention, such as will enable others skilled in the art to which it appertains to make and use the same.

This invention relates to attachments for cultivators; and the object is to provide such an attachment whereby the cultivator-beams may be spread apart or drawn together while the cultivator is in use and without stopping the team.

A further object is to provide an attachment for this purpose which will be simple in construction, easily and quickly operated, and which may be readily attached to cultivators now in use.

With these and other objects in view the invention consists in the construction and arrangement of the parts, as will be hereinafter more fully described and claimed, reference being had to the accompanying drawings, in which—

Figure 1 is a perspective view of a portion of a cultivator, showing the application of the device. Fig. 2 is a rear elevation of the same. Fig. 3 is an enlarged sectional view through the upper end of the attachment, showing the arrangement of the screw.

In the drawings, 1 denotes the cultivator-frame. 2 denotes the beams pivotally connected to the same at their forward ends, and 3 denotes the shovels carried by the beams 2. These parts may be of the ordinary or any approved construction.

4 denotes the attachment for regulating or adjusting the position of the beams, and it comprises a pair of angularly-bent arms or levers 5, crossed and pivoted together near their upper ends after the manner of a pair of tongs. Each arm or lever 5 consists of a rod or bar having a vertically-disposed lower portion 6, the lower end of which is turned outwardly and flattened to form horizontally-disposed attaching members 7, in which are a series of openings or holes, by which said arms are adjustably connected to the cultivator-beams, such attachment being effected by means of clips 8, which are adapted to embrace the said beams at any desirable point along their length, said clips being formed with upwardly-projecting perforated ears or lugs 9, between which the members 7 of the arms are adapted to pass. A pin or bolt 10 is passed through the perforation in the ears 9 and through one of the holes in said members 7, whereby the said parts are pivotally connected together. The arms or levers 5 are bent inwardly at the upper end of the vertical portions 6 at an obtuse angle, as shown at 12, and the angularly-bent portions of the arms are arranged to cross each other about midway their length. A pin or bolt 13 is passed through alined openings formed in said angularly-bent portions at their point of crossing, by which means the arms or levers 5 are pivoted together, a washer 14 being inserted between the arms, as shown. The upper ends of the arms are bent upwardly to form vertically-disposed handle or operating ends 15, the said ends being forked to form yokes 16, alined openings or eyes 17 being formed in the upper ends of the yoke members.

18 denotes a bearing-block arranged between the forked members of one of said yokes, and 19 denotes laterally-projecting studs formed on said block, the said studs being adapted to enter the eyes 17 of said forked members.

20 denotes a longitudinally-disposed opening formed in the block 18.

21 denotes a similarly-constructed block arranged in the opposite yoke, said block being provided with a longitudinally-disposed threaded opening 22, which alines with the opening 20 in the block 18.

23 denotes an operating-screw threaded for a portion of its length, as shown. This screw is adapted to pass through the opening in the block 18, and the threaded end of the same is adapted to engage the threaded opening in the block 21, the opposite end of the screw being formed with a crank-handle 24. 25 denotes collars arranged on said screw on each side of the block 18, by which means the screw 23 is held against lateral movement, but is free to turn in said block, and it is obvious that upon the turning of the crank-handle 24 the screw will be rotated and the arms or levers of the attachment will be opened or closed.

In practice when it is desired to spread the cultivator-beams or to draw them together all that is necessary is for the operator or driver to turn the crank-handle in the proper direction, when the parts will be opened or closed, as desired.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described our invention, what we claim as new, and desire to secure by Letters Patent, is—

1. An attachment for cultivators, comprising a pair of levers having laterally-extending arms 7 at their lower ends, provided with a plurality of adjusting pivot-openings for pivotal and lateral adjustable connection with the beams of a cultivator, said levers having inwardly-extending portions 12, crossed and pivotally connected together, and terminating in upstanding arms 15, blocks pivotally connected to said arms, and a screw-shaft connecting said blocks, substantially as described.

2. A sulky-cultivator having laterally-adjustable cultivator-beams, in combination with clips 8 on said beams, a pair of levers having laterally-extending arms 7 at their lower ends pivotally and adjustably connected to the clips, said levers having inwardly-extending portions 12 crossed and pivotally connected together, and terminating in upstanding arms 15, blocks pivotally connected to said arms, and a screw-shaft connecting said blocks, substantially as described.

In testimony whereof we have hereunto set our hands in presence of two subscribing witnesses.

RUFUS O. FAUBION.
CALVIN W. WORKMAN.
CAVE G. WORKMAN.

Witnesses:
W. H. FOUNTAIN,
J. E. MORGAN.